(12) United States Patent
Schwartz

(10) Patent No.: US 11,040,302 B2
(45) Date of Patent: Jun. 22, 2021

(54) FOLDED FILTER MEDIA PACK WITH VARYING CHANNELS AND DEEP CORRUGATIONS

(71) Applicant: Cummins Filtration IP, Inc., Columbus, IN (US)

(72) Inventor: Scott W. Schwartz, Cottage Grove, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 353 days.

(21) Appl. No.: 16/073,637

(22) PCT Filed: Feb. 14, 2017

(86) PCT No.: PCT/US2017/017765
§ 371 (c)(1),
(2) Date: Jul. 27, 2018

(87) PCT Pub. No.: WO2017/146935
PCT Pub. Date: Aug. 31, 2017

(65) Prior Publication Data
US 2019/0009204 A1 Jan. 10, 2019

Related U.S. Application Data

(60) Provisional application No. 62/299,722, filed on Feb. 25, 2016.

(51) Int. Cl.
*B01D 46/52* (2006.01)
*B01D 46/10* (2006.01)

(52) U.S. Cl.
CPC ........... *B01D 46/522* (2013.01); *B01D 46/10* (2013.01); *B01D 2201/12* (2013.01)

(58) Field of Classification Search
CPC ... B01D 46/10; B01D 46/522; B01D 2201/12
See application file for complete search history.

(56) References Cited

U.S. PATENT DOCUMENTS 2,980,208 A * 4/1961 Neumann .............. B01D 46/02
55/500
4,181,070 A 1/1980 Robbins et al.
(Continued)

FOREIGN PATENT DOCUMENTS

CN 1578697 A 2/2005
CN 101608563 A 12/2009
(Continued)

OTHER PUBLICATIONS

Final Office Action issued for U.S. Appl. No. 14/772,013, dated Nov. 15, 2015, 16 pages.
(Continued)

*Primary Examiner* — Jonathan Miller
*Assistant Examiner* — Gabriel E Gitman
(74) *Attorney, Agent, or Firm* — Foley & Lardner LLP

(57) ABSTRACT

Filter media packs that utilizes a zig-zag folding pattern on deeply corrugated filter media are described. The filter media is scored, folded, and secured into position to form the filter media pack. The filter media pack may be secured using a self-supporting structure (e.g., via tacking adhesive used to secure adjacent folds). The filter media pack contains unique features to optimize filtration performance, such as maximized inlet and outlet face flow areas. In some arrangements, the filter media pack exhibits improved flow characteristics and dust-holding capacity via upstream and downstream channels that have different cross-sectional shapes and/or sizes. The upstream and downstream channels may comprise, for example, circular, diamond shaped, or fish-scale shaped openings.

20 Claims, 3 Drawing Sheets

(56) References Cited

U.S. PATENT DOCUMENTS

| | | | |
|---|---|---|---|
| 4,482,366 A | | 11/1984 | Camplin et al. |
| 4,615,804 A | * | 10/1986 | Wright ............... B01D 46/0001 210/493.1 |
| 5,804,073 A | * | 9/1998 | Ter Horst ............. B01D 25/001 210/493.3 |
| 5,919,122 A | | 7/1999 | Geiger et al. |
| 6,238,561 B1 | | 5/2001 | Liu et al. |
| 6,273,938 B1 | * | 8/2001 | Fanselow ........... B01D 39/1623 55/497 |
| 6,290,635 B1 | | 9/2001 | Demmel et al. |
| 8,236,249 B2 | | 8/2012 | Doring et al. |
| 2006/0151383 A1 | * | 7/2006 | Choi ..................... B01D 46/521 210/493.1 |
| 2007/0102101 A1 | | 5/2007 | Spearin et al. |
| 2010/0032365 A1 | | 2/2010 | Moe et al. |
| 2010/0078379 A1 | | 4/2010 | Rocklitz |
| 2011/0186504 A1 | * | 8/2011 | Rocklitz ................ B01D 25/26 210/493.1 |
| 2011/0259813 A1 | | 10/2011 | Wertz et al. |
| 2014/0325946 A1 | * | 11/2014 | Rocklitz .............. B01D 46/527 55/482 |
| 2015/0047507 A1 | | 2/2015 | Fox et al. |
| 2015/0251111 A1 | * | 9/2015 | Savstrom .............. B01D 29/111 210/493.2 |
| 2016/0016106 A1 | | 1/2016 | Bowerman et al. |

FOREIGN PATENT DOCUMENTS

| | | |
|---|---|---|
| JP | S 58-166906 A | 10/1983 |
| WO | WO 2017/146935 A | 8/2017 |

OTHER PUBLICATIONS

First Office Action and English Language Translation received for Chinese App. No. 201480011707.0 dated May 12, 2016.

First Office Action issued for U.S. Appl. No. 14/772,013, dated Nov. 15, 2015, 11 pages.

International Search Report and Written Opinion for PCT/US2017/017765, dated Apr. 24, 2017, 9 pages.

International Search Report and Written Opinion for PCT/US2014/019946, dated Jun. 12, 2014, 8 pages.

Search Report and Written Opinion issued for PCT/US2017/017765, dated Apr. 24, 2017, 9 pages.

\* cited by examiner

FOLDED FILTER MEDIA PACK WITH VARYING CHANNELS AND DEEP CORRUGATIONS

CROSS-REFERENCE TO RELATED APPLICATIONS

This application is a National Stage of PCT Application No. PCT/US2017/017765, filed Feb. 14, 2017, which claims priority to U.S. Provisional Patent Application No. 62/299,722, entitled "FOLDED FILTER MEDIA PACK WITH VARYING CHANNELS AND DEEP CORRUGATIONS" filed Feb. 25, 2016. The contents of both applications are incorporated herein by reference in their entirety and for all purposes.

TECHNICAL FIELD

The present application relates to filter media for use with filtration systems.

BACKGROUND

Internal combustion engines generally combust a mixture of fuel (e.g., gasoline, diesel, natural gas, etc.) and air. Prior to entering the engine, intake air is typically passed through a filter element to remove contaminants (e.g., particulates, dust, water, etc.) from the intake air prior to delivery to the engine. The filter element requires periodic replacement as the filter media of the filter element captures and removes particulate from the intake air passing through the filter media. The filter media is often corrugated filter media (often referred to as pleated filter media) that is arranged in a panel, a block, a cylinder, or the like.

Corrugated filter media, however, has certain limitations. For example, corrugated filter media begins to lose effectiveness when pleat depths are greater than 50-75 mm. As the pleat depths increase, the pleat density must decrease to offset channel flow losses. However, corrugation depth is often limited and cannot be increased to support lower pleat densities. Additionally, corrugated filter media may lose potentially useful media area by masking of the useful media area. For example, classical corrugated media may have rounded corrugations, which mask much of the media and provide minimal structure against collapse. Further, hot melt spacing and media embossing may also be used, which results in useful media being masked off. Still further, the corrugated media is susceptible to collapse as dust cake forms over the surface area of the filter media.

SUMMARY

One example embodiment relates to a method of making a filter media pack. The method includes scoring and folding a filter media sheet so as to form a plurality of corrugations in the filter media sheet. The method further includes scoring each of the corrugations along a first bend axis of the filter media sheet, and scoring each of the corrugations along a second bend axis of the filter media sheet. The method includes folding the filter media sheet at the first bend axis in a first direction so as to form a plurality of upstream openings positioned between two adjacent corrugations of the plurality of corrugations. The upstream openings are positioned on a first face of the filter media pack. The method further includes folding the filter media sheet at the second bend axis in a second direction that is opposite of the first direction so as to form a plurality of downstream openings positioned between two adjacent corrugations of the plurality of corrugations. The downstream openings positioned on a second face of the filter media pack, the second face is opposite the first face.

Another example embodiment relates to a filter media pack. The filter media pack includes filter media scored and folded in a linear flow direction so as to form a plurality of flow channels. Each of the plurality of flow channels has a plurality of scores at a plurality of bend axes. The filter media is alternately folded at each of the plurality of bend axes so as to form the filter media pack having a plurality of upstream openings and a plurality of downstream openings such that the filter media is not stretched.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, filter media packs that utilizes a zig-zag folding pattern on deeply corrugated filter media are described. The filter media is scored, folded, and secured into position to form the filter media pack. The filter media pack may be secured using a self-supporting structure (e.g., via tacking adhesive used to secure adjacent folds). The filter media pack contains unique features to optimize filtration performance, such as maximized inlet and outlet face flow areas. In some arrangements, the filter media pack exhibits improved flow characteristics and dust-holding capacity via upstream and downstream channels that have different cross-sectional shapes and/or sizes. The upstream and downstream channels may comprise, for example, circular, diamond shaped, or fish-scale shaped openings.

Figure 1:
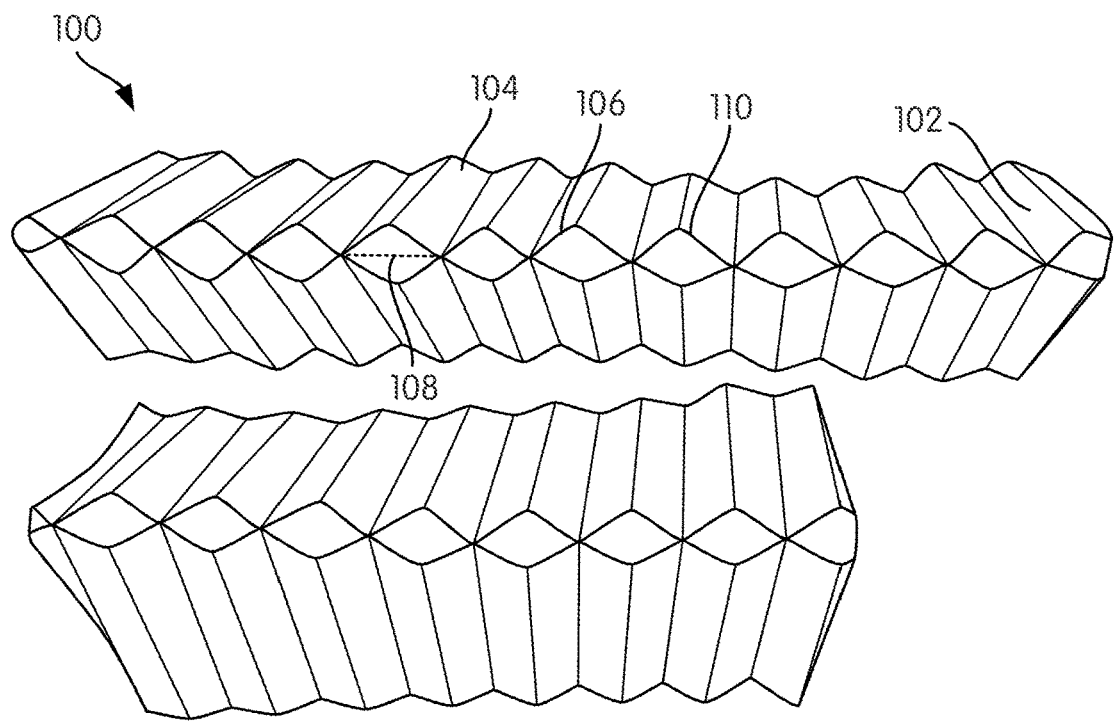
FIG. 1 shows a perspective view of a partially formed filter media pack according to an example embodiment.
Figure 2:
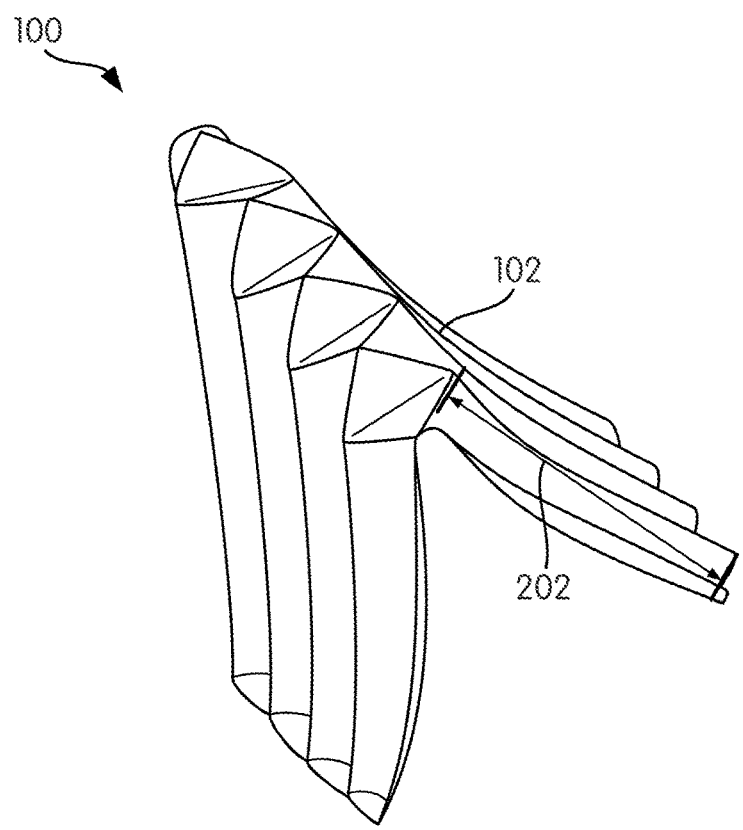
FIG. 2 shows another perspective view of the partially formed filter media pack of FIG. 1.

Referring to FIG. 1, a perspective view of a partially formed filter media pack 100 is shown. FIG. 2 shows another perspective view of the partially formed filter media pack 100. As shown in FIGS. 1 and 2, the filter media pack 100 is formed from a flat sheet of filter media 102 that is scored and folded in a linear flow direction (i.e., the direction that fluid to be filtered will flow into the filter media pack 100) to create triangular flow channels 104 (shown by emphasized fold lines in FIG. 1). The filter media 102 may comprise, for example, cellulose-based filter media, glass filter media, fibrous filter media, nanofiber filter media, or the like. A plurality of scores 106 forming a diamond shape 110 are made at a bend axis 108 of each of the triangular flow channels 104. The plurality of scores 106 extend across each of the triangular flow channels 104. The bend axis 108 is selected based on the width of the filter media 102 in the flow direction such that the height 202 of the final folded filter media pack is selected based on the bend axis 108. As the filter media 102 is folded along the bend axis 108, the plurality of scores 106 forming the diamond shape 110 are depressed thereby allowing the filter media 102 to be folded 180 degrees without being stretched, thereby reducing the chance that the filter media 102 tears during formation of the filter media pack 100.

When the filter media 102 is folded 180 degrees, a plurality of substantially diamond-shaped channels are formed by two opposing triangular channels 104. The crests of each of the substantially diamond-shaped channels are aligned during the folding process. In some arrangements, a tacking adhesive (e.g., hot melt adhesive) is placed along adjacent crests of the diamond-shaped channels to help hold the media pack in shape and to provide general rigidity of the filter media pack 300 for ease of handling during assembly or service. Without the tacking adhesive, the corrugations may collapse during use such that the channels nest together, which substantially reduces performance (i.e., filtering efficiency). The use of the tacking adhesive also provides the filter media pack 300 with enough rigidity such that a support frame may not be needed. By placing the tacking adhesive only along adjacent crests of the diamond-shaped channels, the filtering area lost due to the tacking adhesive masking off a portion of the filter media 102 is minimized.

In some arrangements, the sides of the diamond shape 110 forming the diamond-shaped channels are slightly arched inwards (e.g., towards the center of the diamond shape 110 thereby resulting in openings of the triangular channels 104 that are maximized for flow entering and exiting the filter media pack 100. Without the inwardly arched sides of the diamond shapes 110, the channel open area on an inlet face or an outlet face of the filter media pack 100 is substantially equal to the blocked area (after filter media 102 thickness is considered), which results in a channel entry area of less than 50% of the total filter face area. However, by arching the score lines slightly inward towards the center of the diamond shape 110, the filter media pack 100 creates a flow entry area of greater than 50% of the total inlet or outlet face area.

Figure 3:
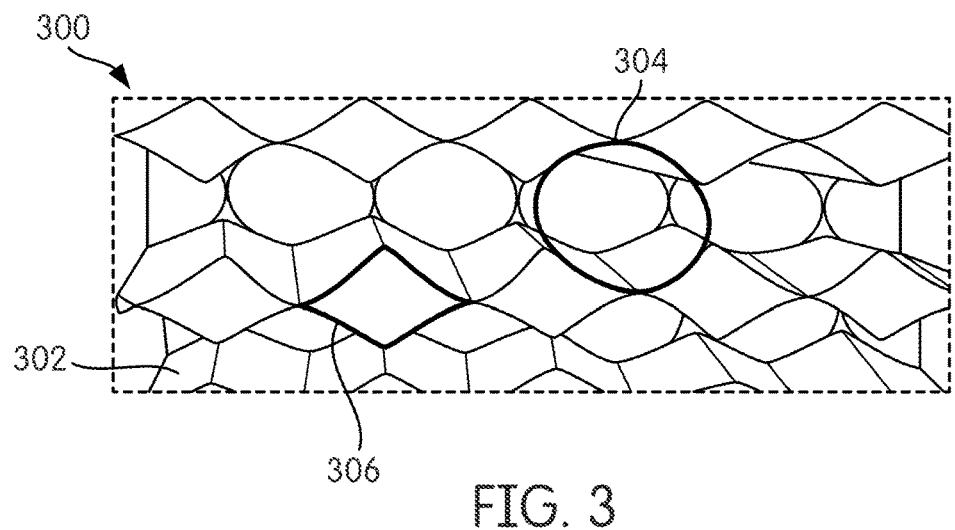
FIG. 3 shows a side-view of the inlet face of a filter media pack according to an example embodiment.
Figure 4:
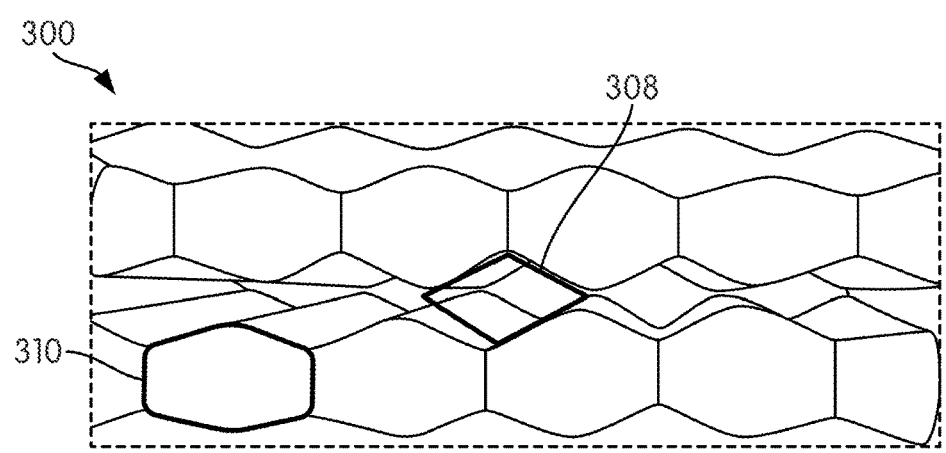
FIG. 4 shows a side-view of the outlet face of the filter media pack of FIG. 3.

In some arrangements, the filter media 102 is alternately folded multiple times to form a layered filter media block having multiple layers of symmetric channels (e.g., in a similar manner as shown with respect to the filter media block 300 shown in FIGS. 3 and 4). As described below, by varying the shape and size of the plurality of scores 106 that create the diamond shape 110, the characteristics of the filter media pack can be varied, such arrangements are described below with respect to FIGS. 3 and 4.

Referring to FIG. 3, a side-view of the inlet face of a filter media pack 300 is shown according to an example embodiment. Referring to FIG. 4, a side-view of the outlet face of the filter media pack 300 is shown. The filter media pack 300 is similar to the filter media pack 100 and is formed through multiple alternating bends of a corrugated filter media 302 in a similar manner as described above with respect to FIGS. 1 and 2. The primary difference between the filter media pack 300 and the filter media pack 100 is the arrangement of the score lines at the bend axis. Specifically, the filter media pack 300 utilizes two different sets of score lines, which results in the filter media pack 300 having asymmetric flow channels (e.g., flow channels having different cross-sectional shapes and/or sizes).

The filter media pack 300 upstream face (i.e., the inlet face; shown in FIG. 3) openings 304 are substantially oval in shape. The upstream face openings 304 are defined by score lines 306 that form a substantially diamond shape with inwardly arched sides (e.g., in a similar manner as described above with respect to the filter media pack 100). The filter media pack 300 downstream face (i.e., the outlet face; shown in FIG. 4) openings 308 are substantially-diamond shaped (e.g., matching the shape of the score lines that define the upstream face openings 304). The downstream face openings 308 are defined by score lines 310 that form a substantially oval shape (e.g., matching the shape of the upstream face openings 304). Accordingly, the score lines 310 are arched outward. As shown in FIGS. 3 and 4, the upstream face openings 304 are larger than the downstream face openings 308. Accordingly, the upstream face openings 304 and the downstream face openings 308 have a different cross-sectional shape and/or size.

In some arrangements, a tacking adhesive (e.g., hot melt adhesive) is placed along adjacent crests that define the outlet face openings 308 to help hold the filter media pack 300 in shape and to provide general rigidity of the filter media pack 300 for ease of handling during assembly or service. Without the tacking adhesive, the corrugations may collapse during use such that the channels nest together, which substantially reduces performance (i.e., filtering efficiency). The use of the tacking adhesive also provides the filter media pack 300 with enough rigidity such that a support frame may not be needed. A tacking adhesive is not used to secure adjacent crests defining the inlet face openings 304 because the adjacent crests are spaced apart.

The different sized and/or cross-sectional shaped openings of the filter media pack 300 result in upstream face openings 304 that are larger than the downstream face openings 308. Accordingly, the openings of the filter media pack 300 maximize the open area for flow entering the filter media pack 300. The larger upstream face openings 304 creates a greater upstream volume in the filter media pack 300 versus the downstream volume. The greater upstream volume provides for a larger dust-holding capacity than the filter media pack 100 (or other filter media packs having equal upstream and downstream volumes). In some arrangements, the score lines 306 are fully inwardly arched such that the upstream face openings 304 are circular. In such arrangements, an upstream volume to downstream volume ratio of 0.785:0.215 can be created. In other arrangements, the score lines 306 are inwardly arched to create an upstream volume to downstream volume ratio of 0.6:0.4. In further arrangements, the score lines 306 are inwardly arched to create an upstream volume to downstream volume ratio of approximately 0.75:0.25.

Figure 5:
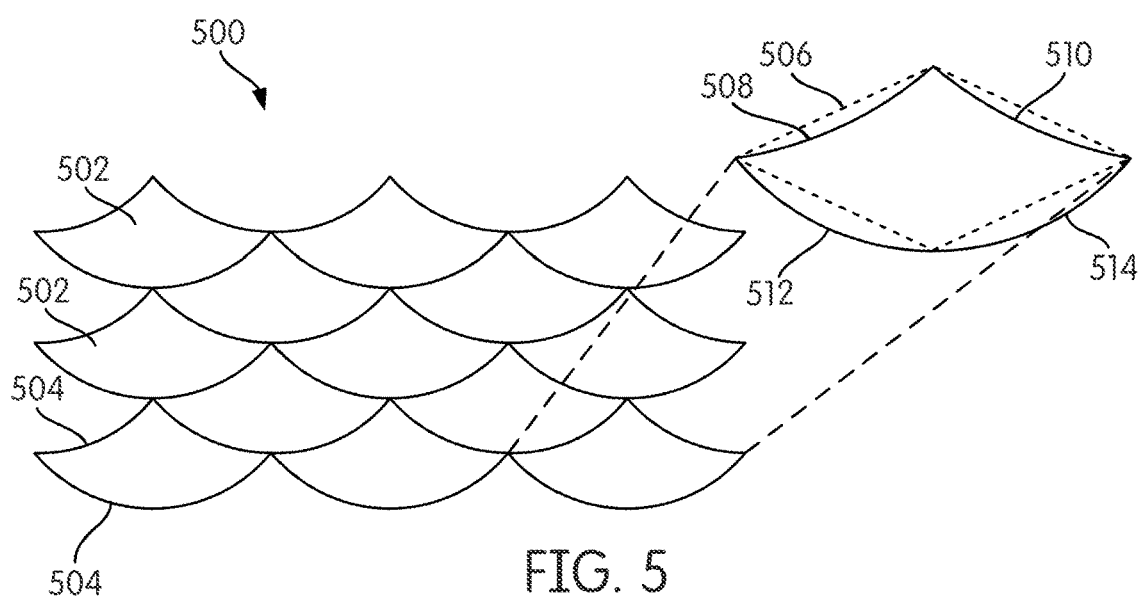
FIG. 5 shows a diagram of a filter media pack opening pattern according to an example embodiment.

Referring to FIG. 5, a diagram of a filter media pack opening pattern 500 is shown. The pattern 500 resembles a "fish scale" opening pattern in which each of the openings 502 (i.e., upstream or downstream openings) are defined by a set of arched score lines 504. As shown in the zoomed in portion of FIG. 5, the pattern 500 is based on a repeating diamond 506 (e.g., similar to the diamond pattern of the filter media pack 100). The pattern 500 is formed by arching two scores 508 and 510 inward, and by arching two scores 512 and 514 outward. In some arrangements, the radius of the arching for each of the scores 508, 510, 512, and 514 is the same. The fish scale pattern 500 helps to reduce alignment sensitivity between successive folds of the filter media forming the filter media pack because the channels formed by the openings 502 nest together. Similar to the filter media pack 100 and the filter media pack 300, a tacking adhesive (e.g., hot melt adhesive) may be placed along adjacent crests of the channels that define the openings 502 to help hold the filter media pack in shape and to provide general rigidity of the filter media pack for ease of handling during assembly or service.

Figure 6:
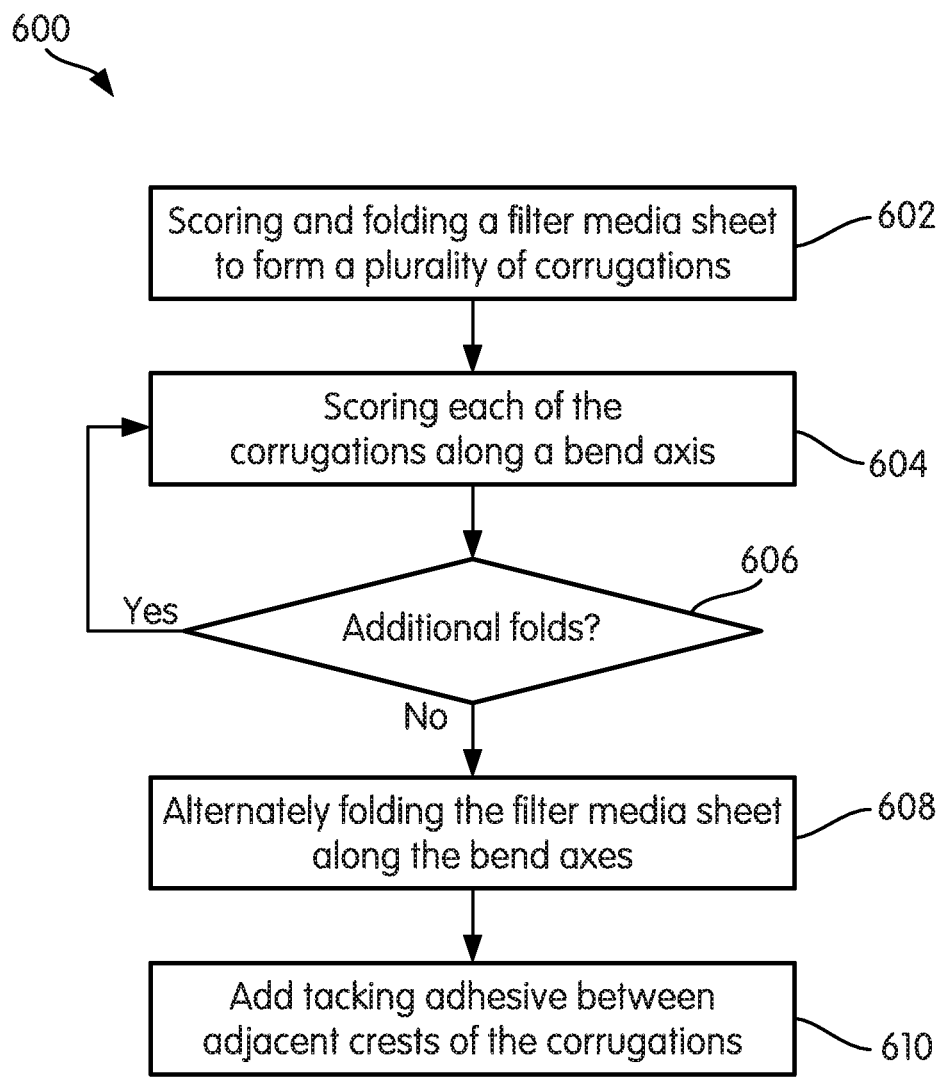
FIG. 6 shows a flow diagram of a method of making a filter media pack according to an example embodiment.

Referring to FIG. 6, a flow diagram of a method 600 of making a filter media pack (e.g., the filter media pack 100, the filter media pack 300, etc.) is shown according to an example embodiment. The method 600 begins when a filter media sheet (e.g., the filter media sheet 102) is scored and folded at 602 to form a plurality of corrugations. The filter media sheet is scored and folded in a linear flow direction (i.e., the direction that fluid to be filtered will flow through the corrugations). Each of the corrugations is scored along a bend axis at 604. The corrugations are scored in any manner as described above with respect to FIGS. 1 through 5. Each bend axis corresponds to a fold of the filter media sheet, which in turn corresponds to a layer of the filter media pack. Accordingly, at 606, it is determined whether there are additional folds for the filter media pack. If there are additional folds, then the method 600 returns to 604. If there are no additional folds required, the method 600 proceeds to 608, where the filter media sheet is alternately folded along the bend axes. During 608, the corrugations formed in 602 form flow channels having alternate open and closed ends. Accordingly, the folding of 608 produces upstream openings positioned between two adjacent corrugations, and downstream openings positioned between two adjacent corrugations. The upstream and downstream openings are positioned on opposite faces of the filter media pack. The upstream and downstream openings may be sized, shaped, and arranged in any of the manners discussed above with respect to FIGS. 1 through 5. Optionally, tacking adhesive is added between adjacent crests of the corrugations at 610. The tacking adhesive is placed along adjacent crests that define the upstream and downstream openings to help hold the filter media pack in shape and to provide general rigidity of the filter media pack for ease of handling during assembly or service.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. The term "approximately" when used with respect to values means plus or minus five percent of the associated value.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A method of making a filter media pack, the method comprising:

scoring and folding a filter media sheet so as to form a plurality corrugations in the filter media sheet;

scoring each of the plurality of corrugations along a first bend axis of the filter media sheet;

providing score lines forming a first shape along the first bend axis;

scoring each of the plurality of corrugations along a second bend axis of the filter media sheet;

providing score lines forming a second shape along the second bend axis;

folding the filter media sheet at the first bend axis in a first direction so as to form a plurality of upstream openings positioned between two adjacent corrugations of the plurality of corrugations, the upstream openings positioned on a first face of the filter media pack; and folding the filter media sheet at the second bend axis in a second direction that is opposite of the first direction so as to form a plurality of downstream openings positioned between two adjacent corrugations of the plurality of corrugations, the downstream openings positioned on a second face of the filter media pack, the second face opposite the first face;

wherein the first shape is different from the second shape.

2. The method of claim 1, wherein the filter media sheet is not stretched during folding of the filter media sheet.

3. The method of claim 1, further comprising applying a tacking adhesive between adjacent crests of the corrugations after the filter media sheet has been folded along the first bend axis and the second bend axis.

4. The method of claim 1, wherein the upstream openings and the downstream openings are diamond shaped.

5. The method of claim 1, wherein the upstream openings are larger than the downstream openings.

6. The method of claim 5, wherein the upstream openings are substantially oval shaped, and wherein the downstream openings are substantially diamond shaped.

7. The method of claim 1, wherein the upstream openings are substantially oval shaped.

8. The method of claim 7, wherein the downstream openings are substantially diamond shaped.

9. A filter media pack comprising:
   filter media scored and folded in a linear flow direction so as to form a plurality of flow channels, each of the plurality of flow channels having a plurality of scores at a plurality of bend axes, the filter media being alternately folded at each of the plurality of bend axes so as to form the filter media pack having a plurality of upstream openings and a plurality of downstream openings such that the filter media is not stretched; wherein the plurality of bend axes includes a first bend axis and a second bend axis;
   wherein the plurality of scores forms a first shape along the first bend axis and a second shape along the second bend axis; and
   wherein the first shape is different from the second shape.

10. The filter media pack of claim 9, further comprising a tacking material positioned between adjacent crests of the plurality of flow channels, the tacking material holding the filter media pack in a desired shape.

11. The filter media pack of claim 9, wherein the plurality of flow channels are triangular in cross-section such that, when the filter media is alternately folded at the plurality of bend axes, a plurality of diamond shaped flow channels are formed.

12. The filter media pack of claim 9, wherein an inlet face of the filter media pack has a flow entry area of greater than 50% of a total inlet face area.

13. The filter media pack of claim 9, wherein the plurality of upstream openings have a different cross-sectional shape than the plurality of downstream openings.

14. The filter media pack of claim 13, wherein the plurality of upstream openings are substantially oval shaped.

15. The filter media pack of claim 14, wherein the plurality of downstream openings are substantially diamond shaped.

16. The filter media pack of claim 13, wherein the plurality of upstream openings are larger than the plurality of downstream openings.

17. The filter media pack of claim 9, wherein the plurality of upstream openings are diamond shaped.

18. The filter media pack of claim 9, wherein the plurality of upstream openings are substantially oval shaped, and wherein the plurality of downstream openings are substantially diamond shaped.

19. A filter media pack comprising:
   filter media scored and folded in a linear flow direction so as to form a plurality of flow channels, each of the plurality of flow channels having a plurality of scores at a plurality of bend axes, the filter media being alternately folded at each of the plurality of bend axes so as to form the filter media pack having a plurality of upstream openings and a plurality of downstream openings such that the filter media is not stretched, wherein the plurality of upstream openings and the plurality of downstream openings are fish scale shaped.

20. A method of making a filter media pack, the method comprising:
   scoring and folding a filter media sheet so as to form a plurality corrugations in the filter media sheet
   scoring each of the plurality of corrugations along a first bend axis of the filter media sheet
   scoring each of the plurality of corrugations along a second bend axis of the filter media sheet;
   folding the filter media sheet at the first bend axis in a first direction so as to form a plurality of upstream openings positioned between two adjacent corrugations of the plurality of corrugations, the upstream openings positioned on a first face of the filter media pack; and
   folding the filter media sheet at the second bend axis in a second direction that is opposite of the first direction so as to form a plurality of downstream openings positioned between two adjacent corrugations of the plurality of corrugations, the downstream openings positioned on a second face of the filter media pack, the second face opposite the first face,
   wherein the upstream openings and the downstream openings are fish scale shaped.

* * * * *